United States Patent [19]

Roger

[11] 4,085,772
[45] Apr. 25, 1978

[54] VALVE ASSEMBLY

[76] Inventor: Harry Roger, 702 Florence, Lot 43, Lafayette, La. 70501

[21] Appl. No.: 686,837

[22] Filed: May 17, 1976

[51] Int. Cl.² ............................................. F16K 17/00
[52] U.S. Cl. .................................... 137/464; 137/522; 137/538
[58] Field of Search ............... 137/456, 460, 462, 464, 137/465, 466, 522, 538

[56] References Cited

U.S. PATENT DOCUMENTS

| | | | |
|---|---|---|---|
| 2,655,935 | 10/1953 | Kinzbach | 137/538 |
| 2,748,947 | 6/1956 | Jay | 137/538 X |
| 2,851,056 | 9/1958 | MacGlashan | 137/464 |
| 3,038,557 | 6/1962 | Callahan | 137/464 X |

*Primary Examiner*—Robert G. Nilson
*Attorney, Agent, or Firm*—Browning, Bushman & Zamecki

[57] ABSTRACT

A valve assembly comprises a valve body having a bore therein, a first opening communicating with the bore, and a second opening displaced from the first opening and also communicating with the bore. A valve element is slidably mounted in the bore for longitudinal movement therein between first and second positions. In the first position the first opening is sealed from communication with the second opening, and in the second position communication between the first and second openings is permitted via the bore. The valve element includes a pressure reaction area exposed to fluid pressure from the second opening in the second position whereby the valve element is retained in the second position upon the presence of fluid pressure in the second opening in excess of a given limit. The assembly further comprises return means for automatically returning the valve element to the first position upon the absence of fluid pressure above the limit in the second opening.

13 Claims, 4 Drawing Figures

VALVE ASSEMBLY

BACKGROUND OF THE INVENTION

1. Field of the Invention

The present invention pertains to valves and particularly to spool valves which are opened and closed by longitudinal sliding of a valve element in the bore of a valve body. Even more specifically, the invention pertains to such a valve which will close automatically upon a drop in the pressure of the fluid which it is communicating so that it may be used as a check valve. For example, where fluid under pressure is being passed from a first conduit or vessel to a second conduit, the fluid flow should be cut off if there is a break in the second conduit. The valve of the present invention can be used to provide for automatic cut-off of the fluid flow in such situations.

2. Description of the Prior Art

In one type of prior art check valve, a piston-like valve element is mounted in a valve body. The valve element has a small diameter bleed passageway which permits limited fluid flow at low velocities but which provides sufficient resistance to high velocity fluid flow that the piston-like valve element is moved thereby from an "opened" to a "closed" position. Such a velocity increase would occur for example, if the downstream should drop due to a break in the outlet line or the like. In the "open" position, a large diameter passageway carries the bulk of the fluid flow. When the valve element is moved to the "closed" position, the large diameter passageway is sealed off. This type of valve is disadvantageous in that the small diameter bleed passageway precludes complete closure. Thus there is, of necessity, leakage of the fluid being handled.

In another type of prior art check valve, a ball-and-seat assembly closes off the fluid flow when the downstream pressure drops, and the fluid flow velocity rises. The valve may be re-opened by manually opening a by-pass to increase the downstream pressure. However, it is then necessary to manually reset the valve to its operating condition so that it may close. Thus the valve may be left locked open, due to negligence or the like, and dangerous and/or expensive leaks may occur.

SUMMARY OF THE INVENTION

The present invention comprises a spool valve assembly including a valve body and a valve element slidably mounted for longitudinal movement in a bore in the valve body. The valve body also has respective inlet and outlet openings communicating with the bore, and the valve element moves between a closed position in which the inlet opening is sealed from communication with the outlet opening and an open position permitting communication between the two openings via the bore. The valve element also includes a pressure reaction area exposed to fluid pressure from the outlet opening when in the open position whereby the valve element is retained in open position upon the presence of fluid pressure in the outlet in excess of a predetermined limit. Return means, such as a spring, automatically returns the valve element to the closed position if the outlet pressure drops below this limit. Once closed, the valve may be reset to open position either manually or by applying fluid pressure to the outlet opening.

The valve operates without the need for a bleed passageway so that, when closed, there is no leakage therethrough. Furthermore, even though the valve may be manually set to the open position, it can always be automatically closed by the return means if the outlet pressure should drop. Thus there is no possibility of the valve being locked open due to negligence on the part of an attendant.

The valve can be readily modified for various pressure ratings by varying the pressure reaction area of the valve element or the restorative force of the return means.

In preferred embodiments of the invention, the bore of the valve body comprises large and small diameter portions, the inlet and outlet openings communicating generally radially with the two portions respectively. The valve element is a shaft-like member overlying the inlet opening in at least the closed position. First and second seals seal between the valve body and valve element in the large diameter portion of the bore on opposite sides of the inlet opening when the valve is in the closed position. Thus there will be no tendency for the inlet pressure to move the valve elements in either direction.

When the valve element is moved into open position, the seal formerly positioned between the inlet and outlet openings is released. Fluid can then flow through the inlet opening, into the annulus between the valve element and the bore of the valve body, and out through the outlet opening.

The seal which is disposed between the inlet and outlet openings in the closed position moves into alignment with the inlet opening in the open position. The longitudinal dimension of this seal is less than that of the inlet opening so that fluid can flow past the seal. Stop means prevents this seal from moving across the inlet opening to the side opposite the outlet. This prevents the seal from being damaged during movement of the valve element and allows the valve to be used in high pressure applications, e.g. up to 5000 psi.

A principal object of the present invention is to provide an improved automatically closing valve assembly.

Another object of the invention is to provide such a valve assembly which provides a complete and positive seal in the closed position.

Still another object of the invention is to provide such a valve assembly which eliminates the possibility of the valve being inadvertently locked in the open position.

A further object of the invention is to provide a type of valve assembly which may be readily modified to accomodate different pressure conditions.

Yet a further object of the invention is to provide a valve assembly which may be used in high pressure applications without seal damage.

Other objects, features, and advantages of the invention will be made apparent by the following description of the preferred embodiments, the drawings, and the claims.

DESCRIPTION OF THE PREFERRED EMBODIMENTS

Figure 1:
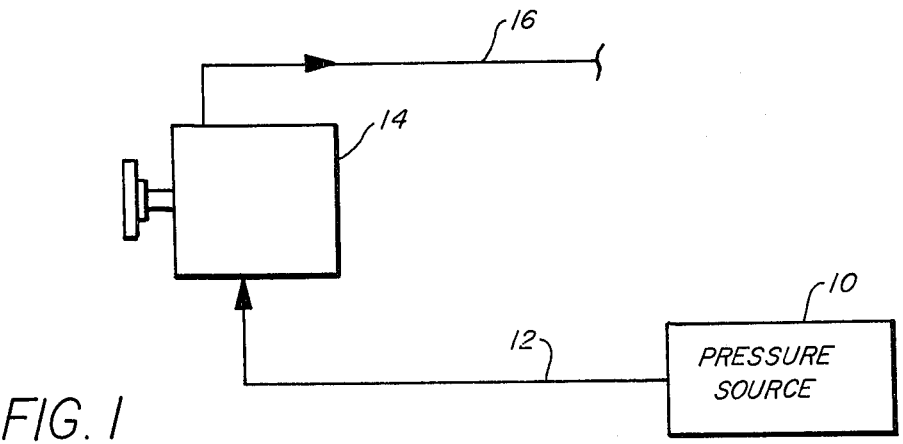
FIG. 1 is a simplified flow diagram illustrating one use of the valve assembly of the present invention.

Referring first to FIG. 1, there is shown a typical application for the valve assembly of the invention. A source 10 of pressurized fluid is connected by an inlet line 12 to the inlet opening of the valve assembly 14. The source 10 may be, for example, a pressure vessel in the oil field, a flowline, a separator, etc. An outlet line or conduit 16 leads away from the outlet opening of the valve assembly 14 to any suitable destination. The valve assembly 14 may be operated to selectively provide communication between lines 12 and 16, but will automatically close if the pressure in line 16 drops below a given limit. Thus, if there shold be a break in line 16 or other difficulty, flow of fluid from the inlet line 12 will be cut off preventing leakage.

Figure 2:
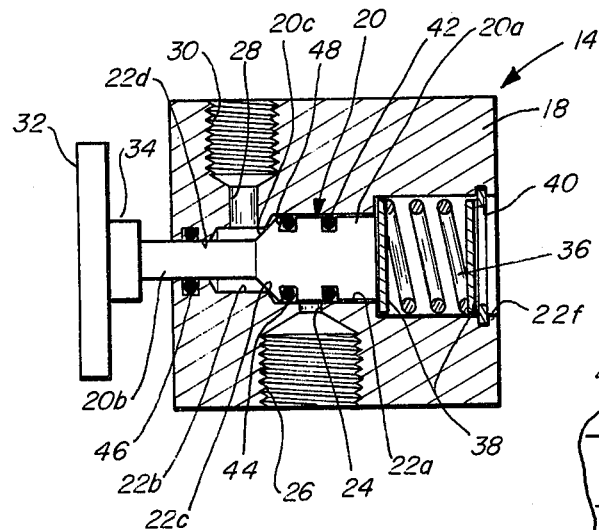
FIG. 2 is a longitudinal sectional view of the valve assembly in closed position.

Referring now to FIG. 2, the valve assembly 14 includes a housing or valve body 18 and a shaft-like spool or valve element 20 slidably mounted for longitudinal movement in a bore 22a–22f through valve body 18. As used herein, terms such as "longitudinal," "radial," "circumferential," etc. will be construed relative to the common centerline of bore 22a–22f and valve element 20 unless otherwise noted.

The bore of valve body 18 includes a large diameter portion including greater and lesser sections 22f and 22a respectively and a small diameter portion including greater and lesser section 22b and 22d. The large and small diameter portions of the bore are connected by an internal annular shoulder 22c. A radial inlet opening 24 communicates with the large diameter portion at section 22a and leads into an enlarged radial socket 26 which is threaded to receive the end of inlet line 12. A radial outlet opening 28 communicates with the small diameter portion at section 22b and leads into an enlarged radial socket 30 threaded to receive the end of outlet line 16.

The valve element 20 includes a large diameter portion 20a, which slides in section 22a of the large diameter portion of the bore in the valve body, and a small diameter portion 20b connected to portion 20a by a tapered external annular shoulder 20c. The axially outer part of portion 20b slides in section 22d of the bore, while the inner part remains at least partially within section 22b of the bore. However, since the diameter of portion 20b of the valve element is substantially less than that of section 22b of the bore, an annular space is formed therebetween.

The valve element 20 extends outwardly of the valve body 18 adjacent the smallest diameter section 22d of the bore, and includes an actuating handle 32 and a stop nut 34 at the outer end.

A compression coil spring 36 is disposed within section 22f of the large diameter portion of the valve body bore axially outwardly of the valve element 20. Spacers 38 are also disposed in section 22f of the bore at opposite ends of spring 36. Spring 36 urges the valve element toward the outlet opening 28, i.e., to the left as viewed in the drawings. The valve element 20, spring 36, and plates 38 are retained in the bore by a snap ring 40 disposed in an internal annular groove in the bore near the outer end of section 22f.

First and second O-ring seals, 42 and 44 respectively, are carried by the large diameter portion 20a of the valve element in respective longitudinally spaced apart external annular gooves. A third seal 46 is disposed in an internal annular groove in the smallest diameter section 22d of the valve body bore to seal against the portion 20b of the valve element.

As shown in FIG. 2, when the valve is in closed position, the first seal 42 is disposed on the opposite side of the inlet opening 24 from the outlet opening 28, and the second seal 44 is disposed on the adjacent side of the inlet opening 24 to the outlet opening 28, and both seal between the large diameter portion 20a of the valve element and section 22a of the bore of the valve body. Thus, the inlet opening 24 is sealed from communication with the outlet opening 28. Since the seals 42 and 44 are of the same diameter, any fluid under pressure which may be present at the inlet opening 24 will encounter equal reaction areas, that is, equal lateral cross sectional areas, in either longitudinal direction in which it tends to flow so that there will be no tendency for the valve element to move in either longitudinal direction regardless of the magnitude of the inlet pressure.

Figure 3:
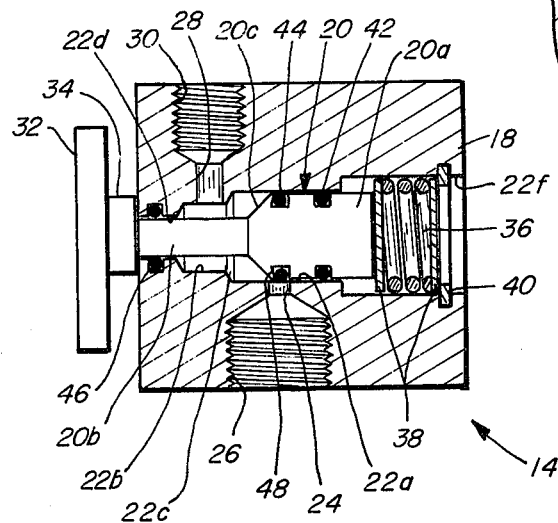
FIG. 3 is a view similar to that of FIG. 2 showing the valve in open position.

When the valve is in closed position, there will normally be no significant fluid pressure at the outlet opening 28 since it is not being fed from the inlet opening 24. However, since the outer diameter of the movable second seal 44 is greater than the inner diameter of the fixed seal 46, the resistance area, or lateral cross sectional area, able to be exposed to fluid pressure from the outlet opening 28 is greater adjacent the second seal 44 than adjacent the third seal 46. Therefore, the second seal 44 and the annular shoulder 20c of the valve element present a greater pressure reaction area than is present at the third seal 46, resulting in a net positive pressure reaction area toward the inlet opening 24. The valve can thus be selectively opened by pressuring the outlet opening 28. The pressure will tend to flow in both longitudinal directions and, since it encounters a net reaction area toward the inlet opening, will cause the valve element 20 to move in that direction to the position of FIG. 3, provided the outlet pressure is sufficient to overcome the force of spring 36.

Alternatively, the valve may be manually opened by pushing in on the handle 32. In either case, as shown in FIG. 3, the net reaction area to outlet pressure on the valve element is still located toward the inlet opening since first seal 42 is still in sealing engagement, and defines the same pressure reaction area as did the second seal 44. Thus, if the outlet pressure continues to exceed the limit dictated by the force constant of spring 36 and the relative difference in pressure reaction area adjacent seals 42 and 46, such pressure will hold the valve element in the open position of FIG. 3. However, if the outlet pressure drops below this limit, e.g. 30 to 300 psi depending on the pressure rating of the valve, the spring 36 will automatically move the valve back to the closed position of FIG. 2.

Referring again to FIG. 3, it can be seen that the abutment of the stop nut 34 with the exterior of the valve body limits the movement of the valve element toward the inlet opening. The spacing of the stop nut with respect to the valve body is such that when the nut is engaged with the body, i.e., when the valve is in open position, the second seal 44 will be moved into substantial alignment with the inlet opening 24 but will not be permitted to move across the inlet opening to the opposite side thereof. This prevents the seal 44 from being cut or otherwise damaged during movement of the valve element, and enables the valve assembly to be used in high pressure applications. Valves of the type shown have been successfully rated for use at pressures up to 5000 psi. The groove in which seal 44 is disposed is dovetailed as shown at 48 to help retain the seal in place.

Figure 4:
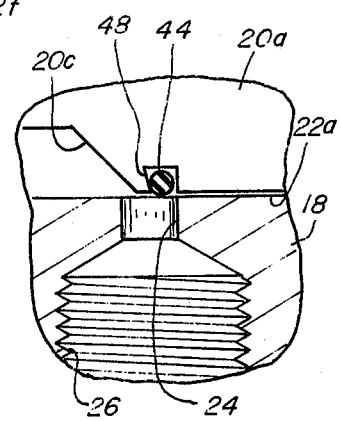
FIG. 4 is a detail view of the inlet opening and adjacent seal with the valve in open position.

FIG. 4 also shows that the longitudinal dimension of the seal 44 is less than that of the inlet opening 24 so that seal 44 is released from sealing engagement and fluid can flow through the inlet opening when the valve is in open position. Thence, the fluid flows into the annular space between section 22b of the valve body bore and portion 20b of the valve element and through the outlet opening 28. The large diameter portion 20a of the valve element is also partially offset from covering the inlet opening 24 in open position to facilitate such flow.

Referring once again to FIG. 2, it can be seen that the shoulder 22c is disposed generally transverse to the bore of the valve body while the shoulder 20c is inclined with respect to shoulder 22c. When the valve is in closed position, the inner edge of shoulder 22c abuts the shoulder 20c intermediate its edges to form a secondary or emergency metal-to-metal seal to help prevent leakage in the event seal 44 should be lost.

Numerous modifications of the specific valve shown may be made within the scope of the invention. For example, the limit for the outlet fluid pressure needed to open the valve or hold it open may be varied by varying the spring and/or by varying the relative diameters of portions 22a and 22b of the valve bore (i.e., the effective pressure reaction areas). Also, as shown in the drawings, the inlet and outlet openings are located at 180° circumferentially from each other in the valve body. However, the openings may be located 90° from each other or in any other convenient relative position. It also anticipated that return means other than the coil spring 36 may be used for automatically closing the valve responsive to a drop in outlet pressure. Accordingly, it is intended that the scope of the invention be limited only by the claims which follow.

I claim:

1. A valve assembly comprising:
a valve body having a bore therein, a first opening communicating with said bore and of limited circumferential extent in said bore, and a second opening longitudinally displaced from said first opening and communicating with said bore;
a valve element slidably mounted in said bore for longitudinal movement in said bore between a first position in which said first opening is sealed from communication with said second opening and a second position permitting communication between said first and second openings via said bore, said valve element including means defining a pressure reaction area exposed to fluid pressure from said second opening in said second position whereby said valve element is retained in said second position upon the presence of fluid pressure in said second opening in excess of a predetermined limit;
annular seal means carried by said valve element and sealing between said valve body and said valve element between said first and second openings in said first position;
wherein said bore includes a substantially uniform diameter section including a portion of said bore against which said seal means seals in said first position and a portion of said bore directly intersecting said first opening;
stop means cooperative between said valve body and said valve element to retain said seal means in substantial but non-sealing alignment with said first opening in said second position; and
return means, operatively associated with said valve element, for automatically returning said valve element to said first position upon the absence of fluid pressure above said limit in said second opening.

2. The valve assembly of claim 1 wherein said first opening is an inlet opening and said second opening is an outlet opening.

3. The valve assembly of claim 1 further comprising control means for selectively moving said valve element from said first position to said second position.

4. The valve assembly of claim 3 wherein said pressure reaction area is exposed to said second opening in said first position.

5. The valve assembly of claim 3 wherein said valve element has a portion extending outwardly from said valve body and comprising at least a part of said control means.

6. The valve assembly of claim 5 wherein said pressure reaction area is exposed to said second opening in said first position.

7. The valve assembly of claim 1 wherein said return means comprises resilient means cooperative between said valve element and said valve body to urge said valve element toward said first position.

8. The valve assembly of claim 1 wherein said resilient means comprises a compression spring.

9. The valve assembly of claim 1 wherein said seal means is of lesser longitudinal dimension than said first opening.

10. A valve assembly comprising:
a valve body having a bore therein, said bore comprising a large diameter portion and a smaller diameter portion, said valve body further having an inlet opening communicating generally radially with said large diameter portion and an outlet opening communicating generally radially with said small diameter portion;
a valve element comprising a shaft-like member slidably mounted in said bore for longitudinal movement in said bore between a first position, in which said shaft-like member overlies said inlet opening and said inlet opening is sealed from communication with said outlet opening, and a second postion permitting communication between said inlet and outlet openings via said bore, said valve element including means defining a pressure reaction area exposed to fluid pressure from said outlet opening in said second position whereby said valve element is retained in said second position upon the presence of fluid pressure in said outlet opening in excess of a predetermined limit;
first annular seal means sealing between said valve body and said valve element in said large diameter portion of said bore on the opposite side of said inlet opening from said outlet opening in said first position;
second annular seal means sealing between said valve body and said valve element in said large diameter portion of said bore on the adjacent side of said inlet opening to said outlet opening in said first position, said second seal means being released from sealing engagement in said second position;
and return means, operatively associated with said valve element, for automatically returning said valve element to said first position upon the absence of fluid pressure above said limit in said outlet opening.

11. The valve assembly of claim 10 wherein said second seal means is carried by said valve element and is of lesser longitudinal dimension than said inlet opening, said assembly further comprising stop means cooperative between said valve body and said valve element to retain said second seal means in substantial alignment with said inlet opening in said second position.

12. The valve assembly of claim 10 wherein said first seal means seals between said valve body and said valve element on the opposite side of said inlet opening from said outlet opening in said second position, said assembly further comprising third seal means sealing between said valve body and said valve element on the opposite side of said outlet opening from said inlet opening in both said first and said second positions.

13. The valve assembly of claim 10 wherein said valve element has a large diameter portion disposed at least partially within said large diameter portion of said bore and a small diameter portion disposed at least partially within said small diameter portion of said bore, said valve body forming an internal annular shoulder between said large and small diameter portions of said bore, said valve element forming an external annular shoulder between the large and small diameter portions thereof, one of said shoulders being inclined with respect to the other of said shoulders and the edge of said other shoulder abutting said one shoulder in said first position to form a secondary seal between said valve body and said valve element.

* * * * *